US009357544B2

(12) United States Patent
Chen et al.

(10) Patent No.: US 9,357,544 B2
(45) Date of Patent: May 31, 2016

(54) METHOD AND DEVICE FOR DETERMINING PDSCH TRANSMISSION RESOURCES

(71) Applicant: China Academy of Telecommunications Technology, Beijing (CN)

(72) Inventors: Wenhong Chen, Beijing (CN); Qiubin Gao, Beijing (CN); Ying Peng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/407,467

(22) PCT Filed: Jun. 8, 2013

(86) PCT No.: PCT/CN2013/077000

§ 371 (c)(1),
(2) Date: Dec. 12, 2014

(87) PCT Pub. No.: WO2013/185580

PCT Pub. Date: Dec. 19, 2013

(65) Prior Publication Data

US 2015/0173049 A1    Jun. 18, 2015

(30) Foreign Application Priority Data

Jun. 12, 2012  (CN) .......................... 2012 1 0193689

(51) Int. Cl.
*H04W 72/04* (2009.01)
*H04W 72/08* (2009.01)
(Continued)

(52) U.S. Cl.
CPC .............. *H04W 72/042* (2013.01); *H04L 5/005* (2013.01); *H04L 5/0035* (2013.01);
(Continued)

(58) Field of Classification Search
CPC ..... H04W 72/00–72/0453; H04L 5/00–5/0048
USPC ................................................ 370/328–331
See application file for complete search history.

(56) References Cited

U.S. PATENT DOCUMENTS 5,225,670 A      7/1993  She et al.
2013/0083753 A1*  4/2013  Lee ................... H04W 72/0453
                                                                370/329
(Continued)

FOREIGN PATENT DOCUMENTS

CN            102469496 A       5/2012

OTHER PUBLICATIONS

Samsung: "Interference Measurement Resource for Downlink CoMP", 3GPP Draft; R1-122236 IMR, 3rd Generation Partnership Project (3GPP), Mobile Competence Centre , 650, Route Des Lucioles ; F-06921 Sophia-Antipolis Cedex ; France, vol. RAN WG1, no. Prague, Czech Republic; May 21, 2012-May 25, 2012, May 12, 2012, XP050600500, [retrieved on May 12, 2012].

(Continued)

*Primary Examiner* — Afsar M Qureshi
(74) *Attorney, Agent, or Firm* — Kilpatrick Townsend & Stockton LLP

(57) ABSTRACT

The present invention relates to the field of communications, and disclosed are a method and device for determining a PDSCH transmission resource. The method is: in the embodiments of the present invention, a network side determines a mapping relationship between a PDSCH transmission point and a zero-power CSI-RS for UE, and the UE does not receive a PDSCH over a zero-power CSI-RS resource which corresponds to a cell currently transmitting the PDSCH and measures an interference and still receives the PDSCH over a zero-power CSI-RS resource which corresponds to a cell not currently transmitting the PDSCH and measures an interference, thereby ensuring that the UE can accurately measure the interference and further improving the accuracy of CQI estimation; furthermore, the signalling overhead required for realizing the technical solution of the present invention is very small, only some RRC signalings are required, and a dynamic signaling can reuse a current signaling to the greatest extent, in this way, the compatibility of the system is effectively improved and the complexity of implementation is reduced.

16 Claims, 6 Drawing Sheets

(51) Int. Cl.
*H04W 24/08* (2009.01)
*H04W 24/10* (2009.01)
*H04L 5/00* (2006.01)

(52) U.S. Cl.
CPC ........... *H04L 5/0044* (2013.01); *H04L 5/0048* (2013.01); *H04W 24/08* (2013.01); *H04W 72/082* (2013.01); *H04L 5/0007* (2013.01); *H04W 24/10* (2013.01)

(56) References Cited

U.S. PATENT DOCUMENTS

| | | | | |
|---|---|---|---|---|
| 2013/0188566 A1* | 7/2013 | Zhu | ..................... | H04W 72/042 370/329 |
| 2013/0201942 A1* | 8/2013 | Kim | ..................... | H04W 76/045 370/329 |
| 2013/0301548 A1* | 11/2013 | Etemad | ............... | H04W 76/048 370/329 |
| 2014/0016496 A1* | 1/2014 | Su | ......................... | H04B 7/0626 370/252 |
| 2015/0236836 A1* | 8/2015 | Seo | ....................... | H04L 5/0055 370/329 |
| 2015/0334683 A1* | 11/2015 | Guo | ..................... | H04L 5/0035 370/329 |

OTHER PUBLICATIONS

Mediatek Inc: "Further discussion on 1-15 interference measurement for CoMP", 3GPP Draft; R1-122160 Interference Measurement (Final), 3rd Generation Partnership Project (3GPP), Mobile Competence Centre , 650, Route Des Lucioles ; F-06921 Sophia-Antipolis Cedex ; France, vol. RAN WG1, no. Prague, Czech Republic; May 21, 2012-May 25, 2012, May 12, 2012, XP050600425, [retrieved on May 12, 2012].
Catt: "Discussion on interference 1-15 measurement mechanisms", 3GPP Draft; R1-122040, 3rd Generation Partnership Project (3GPP), Mobile Competence Centre ; 650, Route Des Lucioles ; F-06921 Sophia-Antipolis Cedex ; France, vol. RAN WG1, no. Prague, Czech Republic; May 21, 2012-May 25, 2012, May 12, 2012, XP050600330, [retrieved on May 12, 2012].
Extended European Search Report issued on Jun. 16, 2015 in the EP counterpart application (13803949.0).
International Search Report and Written Opinion for PCT/CN2013/077000 (Both English and Chinese version).
"Consideration on Interference Measurement Resource", LG Electronics, 3GPP TSG RAN WG1 Meeting #69 R1-122295.
The Office Action issued on Oct. 12, 2015 in the CN counterpart application (201210193689.5).

* cited by examiner

--Prior Art--

--Prior Art--

METHOD AND DEVICE FOR DETERMINING PDSCH TRANSMISSION RESOURCES

This application is a US National Stage of International Application No. PCT/CN2013/077000, filed 8 Jun. 2013, designating the United States, and claiming priority to Chinese Patent Application No. 201210193689.5, filed with the State Intellectual Property Office of China on Jun. 12, 2012 and entitled "Method and device for determining PDSCH transmission resources", which is hereby incorporated by reference in its entirety.

FIELD OF THE INVENTION

The present invention relates to the field of communications and particularly to a method a device for determining PDSCH transmission resources.

BACKGROUND OF THE INVENTION

The technology of Coordinated Multipoint Transmission/Reception (CoMP) in the prior art refers to coordination between multiple geographically separate transmission points to lower interference between the transmission points to thereby improve the quality of signals received by users so as to improve effectively the capacity of a system and the spectrum efficiency of edge users. Typically the multiple separate transmission points refer to base station equipments of multiple cells or can be multiple Remote Radio Heads (RRHs) controlled by the same base station of a cell. With coordinated transmission between the multiple transmission points, interference between the different transmission points can be lowered and the throughput of users, particularly users at the edge of a cell, can be improved effectively. In the current study, a set of transmission points participating directly or indirectly coordinated transmission for User Equipment (UE) is referred to as a coordination set, and a set of transmission points for which the UE needs to measure downlink channel information is referred to as a measurement set, and a set of transmission points participating directly in transmitting a Physical Downlink Shared Channel (PDSCH) of the UE is referred to as a transmission set.

In a practical application, the technology of coordinated multipoint transmission/reception is generally categorized into Cooperative Scheduling/Beamforming (CS/CB) and Joint Processing (JP).

Cooperative scheduling refers to that respective base station performs coordination on time, frequency and space resources between cells to allocate orthogonal resources to different UEs to thereby avoid interference between the cells. Interference between the cells is a predominant factor restricting the performance of a UE at the edge of a cell, and with cooperative scheduling, interference between the cells can be lowered to thereby improve the performance of a UE at the edge of a cell. Referring to FIG. 1, for example, with cooperative scheduling of three cells, three UEs which may possibly interfere with each other are scheduled onto orthogonal resources, to thereby avoid interference between the cells effectively. Cooperative beam-forming refers to scheduling beam-forming directions of multiple users in cooperating cells, to make beam directions of different users in the cells mutually orthogonal to thereby lower interference between the users. Similar to Multi-User Multi-Input Multi-Output (MU-MIMO) transmission in a single cell, cooperative beam-forming is generally performed through interference suppression at a transmitter, in order to suppress the interference from transmission by the current user to transmission by another user, downlink channel information of the cooperating cells needs to be obtained at the base station end.

Joint processing includes two schemes of dynamic transmission point switching and joint transmission:

In the scheme of dynamic transmission point switching, a base station can switch dynamically a transmission point to transmit a signal, to a user to thereby select the optimum transmission point each time to transmit data; and in order to perform dynamic transmission point switching, the base station needs to obtain channel information of multiple optional transmission points over a feedback channel, or obtain channel information of the optimum transmission point.

In the scheme of joint transmission, the multiple transmission points transmit data concurrently to the UE to thereby enhance the received signal of the UE. As illustrated in FIG. 2, three transmission points transmit data to a UE on the same resource, and the UE receives the signals of the multiple transmission points concurrently; thus on one hand, useful signals from multiple transmission points may be superimposed to improve the quality of the received signal of the UE, and on the other hand, interference to the UE can be lowered to thereby improve the performance of the system. In this scheme, the UE is required to feed back channel information of the multiple transmission points and even relative channel information between the transmission points, to thereby enable the multiple transmission points to perform scheduling, pre-coding and data transmission jointly. This transmission scheme can be extended to a scheme of Multi-User Joint Transmission (MU-JT), that is, these multiple transmission points transmit data to multiple UEs concurrently on the same resource, and the performance of demodulation is ensured by orthogonal DMRSs between these multiple UEs.

In order to provide sufficient information for downlink CoMP transmission, the base station needs to indicate different types of reference signals or reference resources to the UE, and the UE performs some operations with these reference signals to support the different transmission schemes above. The reference signals or reference resources indicated by the base station may include but will not be limited to the followings:

1) Non-Zero Power Channel State Information Reference Signal (CSI-RS)

In order to measure channel state information of the multiple transmission points for CoMP transmission, the base station needs to indicate multiple non-zero power CSI-RS resources respectively for measuring Channel State Information (CSI) of the different transmission points. Generally each transmission point corresponds respectively to a non-zero power CSI-RS resource for measuring channel state information of the transmission point.

2) Zero-Power CSI-RS

For a UE (which is referred to as UE1 below), a transmission point other than its corresponding measurement set may also use a zero power CSI-RS for performing a channel measurement of a served UE (which is referred to as UE2 below). In order to enable these CSI-RS resources to be correctly received and used by the UE2 to measure CSI, the UE1 needs to perform rate matching for PDSCH data transmission at a corresponding location, that is, on a CSI-RS resource configured with zero power, PDSCH transmission of the UE1 may be muted so that the UE1 will not receive any PDSCH data transmitted by the base station side, and the base station will not transmit any PDSCH data to the UE1, all of which will be realized by configuring the zero power CSI-RS resource.

On the other hand, in some application scenarios, some resources may be configured for interference measurement, and zero power CSI-RSs will also be configured on these resources, to keep interference measurement from an influence of data transmission. The base station may configure the UE with multiple zero power CSI-RS resources for different use.

3) Interference Measurement Resource (IMR).

In order to enable the UE to measure a required interference signal, e.g., interference outside a certain set (measurement set or cooperation set) of transmission points, the base station will configure the UE with some interference measurement reference resources so that the UE measures interference on these resources to thereby estimate a CQI.

In order to obtain different interference information, the base station may configure the UE with multiple interference measurement reference resources. In a practical application, the base station may select for the UE the interference measurement reference resources among the zero power CSI-RSs, that is, the zero power CSI-RS resources and the interference measurement reference resources may partially overlap.

All of the three types of reference signals/reference resources above are notified to the UE through higher-layer signaling.

In a practical application, for an interference measurement reference resource for measuring interference outside a certain set of transmission points, the transmission points in the set of transmission points shall not transmit PDSCH data to any UE on this interference measurement reference resource, whereas transmission points other than the set of transmission points can transmit PDSCH data to any UE on the interference measurement reference resource without performing rate matching, so that all the UEs configured with the interference measurement reference resource may measure interference other than the set of transmission points correctly.

However, an interference measurement reference resource is currently configured by configuring a zero power CSI-RS resource which requires quasi-static higher-layer signaling so that the UE will not receive PDSCH data on the corresponding resource (that is, performing PDSCH muting); but a PDSCH transmission point of the UE may vary dynamically so that the configuration of corresponding zero power CSI-RS may fail to match with the current PDSCH transmission point, for example, an IMR is configured for measuring interference outside some transmission point or points, whereas a transmission point currently transmitting PDSCH data to the UE is not a transmission point corresponding to the IMR above, so that the UE will still receive the PDSCH data at the location of the IMR, and consequently the UE may not measure the magnitude of interference of the target transmission point, thus degrading the accuracy of estimating a CQI.

SUMMARY OF THE INVENTION

Embodiments of the present invention provide a method and device for determining PDSCH transmission resources so as to enable a UE to make intended interference measurement.

Particular technical solutions according to embodiments of the present invention are as follows.

A method for determining PDSCH transmission resources, which includes:

determining respectively a zero power CSI-RS resource corresponding to each of transmission points in a set of candidate PDSCH transmission points of a user equipment;

notifying the user equipment of a correspondence relationship between the respective transmission points and the zero power CSI-RS resources; and determining and notifying the user equipment of the current PDSCH transmission point(s) of the user equipment so that the user equipment receives PDSCH on the other resources than the zero power CSI-RS resource(s) corresponding to the current PDSCH transmission point(s).

A method for determining a PDSCH transmission resources, which includes:

determining respectively, from a network side notification, a correspondence relationship between each of transmission points in a set of candidate PDSCH transmission points and a corresponding zero power CSI-RS resource;

determining the current PDSCH transmission point(s) from a network side notification; and receiving PDSCH on the other resources than the zero power CSI-RS resource(s) corresponding to the current PDSCH transmission point(s).

A device for determining PDSCH transmission resources, which includes:

a determining component configured to determine a zero power CSI-RS resource corresponding to each of transmission points in a set of candidate PDSCH transmission points of a user equipment; and a communicating component configured to notify the user equipment of a correspondence relationship between the respective transmission points and the zero power CSI-RS resources and to determine and notify the user equipment of the current PDSCH transmission point(s) of the user equipment so that the user equipment receives PDSCH on other resource than the zero power CSI-RS resource(s) corresponding to the current PDSCH transmission point(s).

A device for determining PDSCH transmission resources, which includes:

a processing component configured to determine from a network side notification a correspondence relationship between each of transmission points in a set of candidate PDSCH transmission points and a corresponding zero power CSI-RS resource respectively, and to determine current PDSCH transmission point(s) from a network side notification; and a communicating component configured to receive PDSCH on other resources than the zero power CSI-RS resource(s) corresponding to the current PDSCH transmission point(s).

In embodiments of the present invention, a mapping relationship between PDSCH transmission points and zero power CSI-RSs is determined by the network side for a UE, and the UE will not receive PDSCH on a zero power CSI-RS resource for measurement interference corresponding to a cell in which a PDSCH is transmitted currently but still receive a PDSCH on a zero power CSI-RS resource for measurement interference corresponding to a cell in which no PDSCH is transmitted currently, so that all the UEs can measure desirable interference to thereby ensure that the UEs are enable to make accurate interference measurement, so as to improve the accuracy of estimating a CQI; and on the other hand, the signaling overheads required for the implementation of technical solutions of the present invention are very low, only some RRC signaling is required, and the dynamic signaling may maximize the reuse of current signaling, thus effectively improving the compatibility of the system and lowering the implementing complexity of the system.

DETAILED DESCRIPTION OF THE EMBODIMENTS

In order to enable a UE to make accurate interference measurement for a target transmission point on an appropriate interference measurement reference resource, in embodiments of the present invention, the UE will not receive PDSCH on a zero power CSI-RS resource for measurement interference corresponding to a cell in which a PDSCH is transmitted currently, but still receive a PDSCH on a zero power CSI-RS resource for measurement interference corresponding to a cell in which no PDSCH is transmitted currently, so that all the UEs can measure desirable interference.

Preferred embodiments of the present invention will be described below in details with reference to the drawings.

Figure 1:
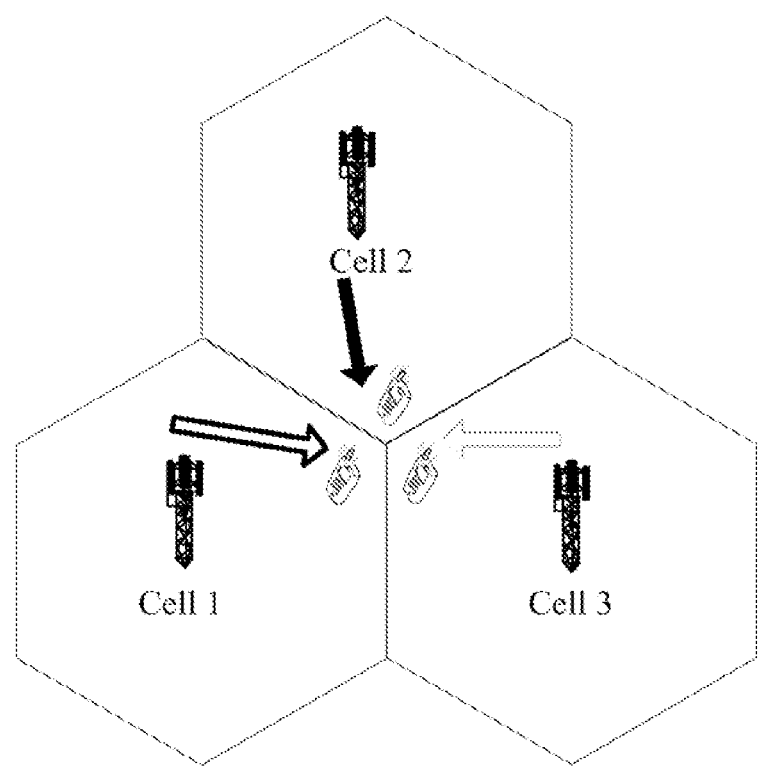
FIG. 1 and FIG. 2 are schematic diagrams of coordinated multipoint transmission/reception in the prior art.
Figure 2:
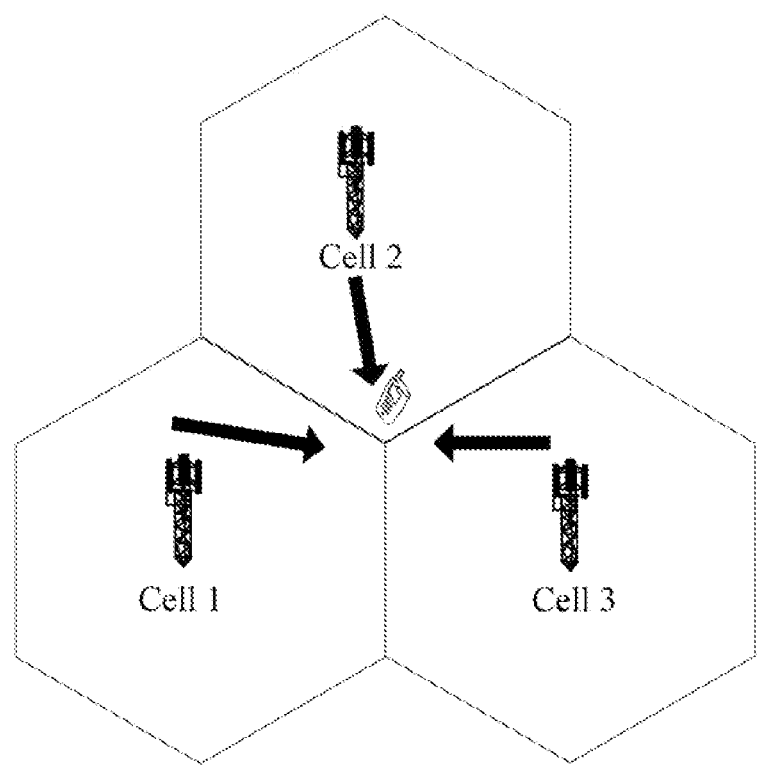
Figure 3:
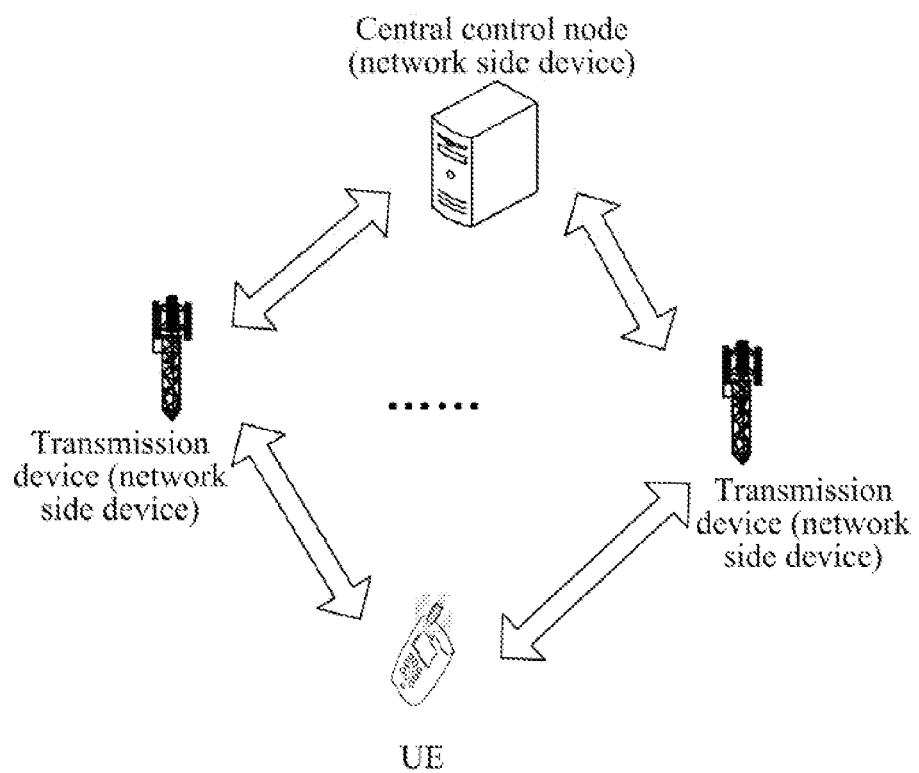
FIG. 3 is a framework diagram of a communication system according to an embodiment of the present invention.

Referring to FIG. 3, in an embodiment of the present invention, a communication system of CoMP technology includes a UE and several transmission devices between which there is a coordinated multipoint transmission relationship.

Figure 4:
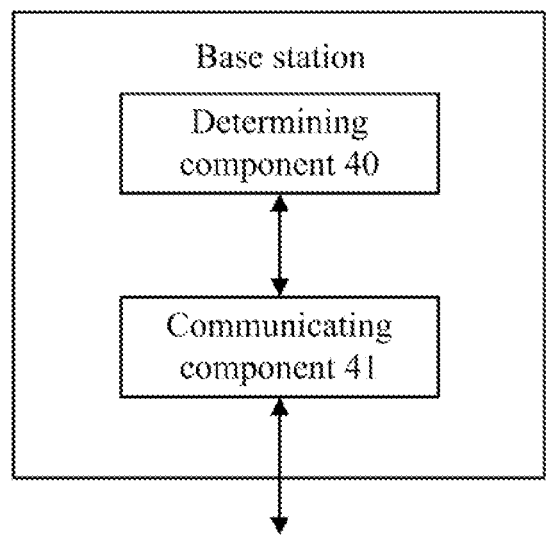
FIG. 4 is a schematic functional structural diagram of a base station according to an embodiment of the present invention.
Figure 5:
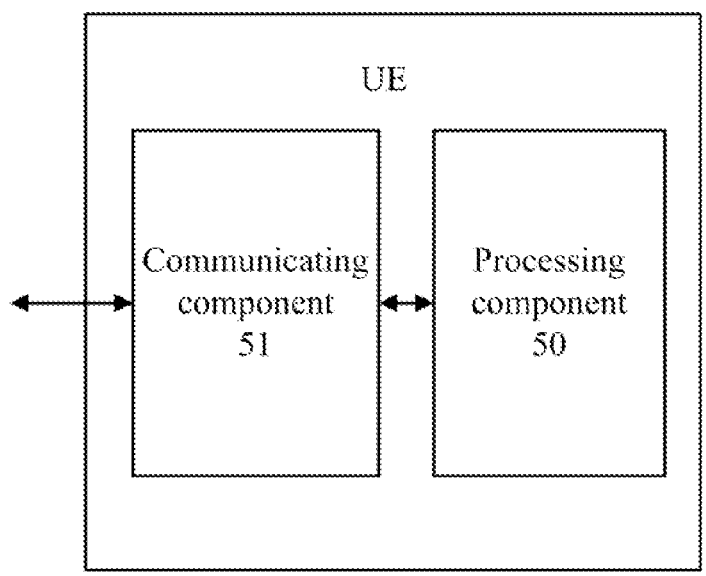
FIG. 5 is a schematic functional structural diagram of a user equipment according to an embodiment of the present invention.

Referring to FIG. 4 and FIG. 5, in an embodiment of the present invention, a base station includes a determining component 40 and a communicating component 41.

The determining component 40 is configured to determine respectively a zero power CSI-RS resource corresponding to each of transmission points in a set of candidate PDSCH transmission points of a UE; and The communicating component 41 is configured to notify the UE of a correspondence relationship between the respective transmission points and the zero power CSI-RS resources and to determine and notify the UE of the current PDSCH transmission point(s) of the UE so that the UE receives PDSCH on the other resources than the zero power CSI-RS resource(s) corresponding to the current PDSCH transmission point(s).

A UE includes a processing component 50 and a communicating component 51, where:

The processing component 50 is configured to determine from a network side notification a correspondence relationship between each of transmission points in a set of candidate PDSCH transmission points and a corresponding zero power CSI-RS resource respectively, and to determine the current PDSCH transmission point(s) from a network side notification; and The communicating component 51 is configured to receive PDSCH on the other resources than the zero power CSI-RS resource(s) corresponding to the current PDSCH transmission point(s).

Figure 6:
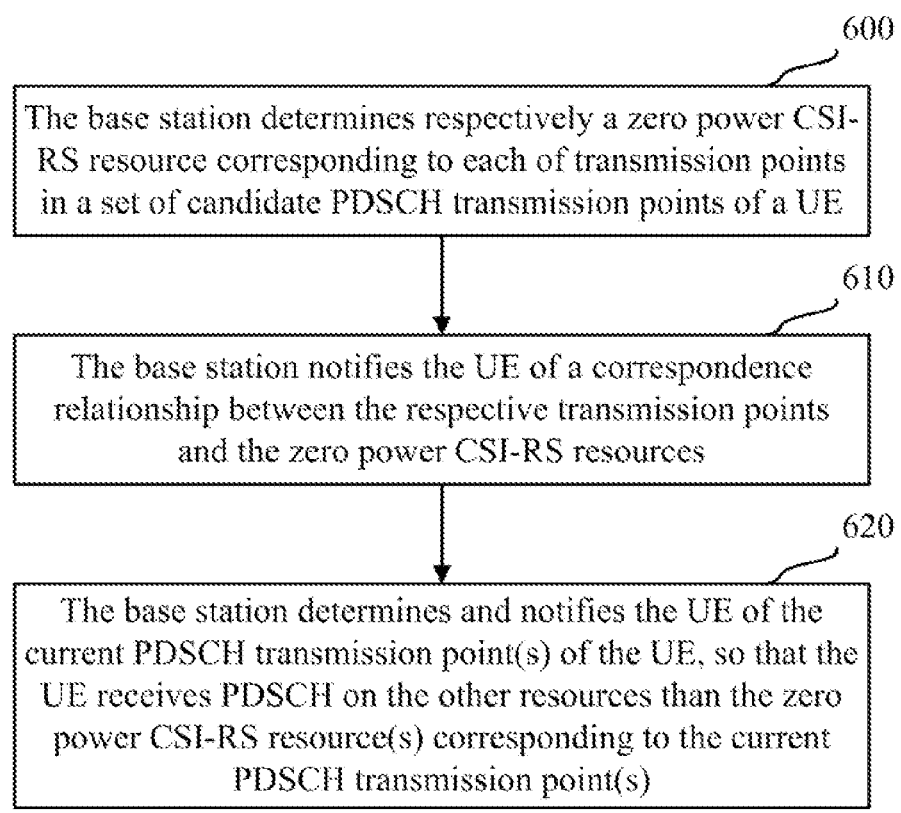
FIG. 6 is a flow chart of determining a PDSCH transmission resource by a base station according to an embodiment of the present invention.

Referring to FIG. 6, in an embodiment of the present invention, a base station determines a PDSCH transmission resource in the following detailed flow.

In the operation 600, the base station determines respectively a zero power CSI-RS resource corresponding to each of transmission points in a set of candidate PDSCH transmission points of a UE.

In an embodiment of the present invention, the set of candidate PDSCH transmission points of the UE may be a CoMP measurement set (simply a measurement set) or a CoMP cooperation set (simply a cooperation set). In a practical application, a set of transmission points for which the UE needs to measure downlink channel information is referred to as a measurement set, and a set of transmission points participating directly or indirectly coordinated transmission to the UE is referred to as a cooperation set, where the measurement set is a subset of the cooperation set.

In an embodiment of the present invention, the base station may determine from an higher-layer indication (e.g., a central control node) at least one zero power CSI-RS resource for rate matching corresponding to each of the transmission points in the set of candidate PDSCH transmission points of the UE; or may determine from the current network environment at least one zero power CSI-RS resource for rate matching corresponding to each of the transmission points in the set of candidate PDSCH transmission points of the UE.

For any one of the transmission points in the set of candidate PDSCH transmission points, among the zero power CSI-RS resources determined by the base station, all the zero power CSI-RS resources are configured as interference measurement reference resources for measuring interference of transmission points, outside a set of transmission points including the any one transmission point (which can be a cooperation set, a measurement set or another type of set).

Alternatively, for any one of the transmission points in the set of candidate PDSCH transmission points, among the zero power CSI-RS resources determined by the base station, all the zero power CSI-RS resources correspond to non-zero power CSI-RS resources used by several transmission points (i.e., CSI-RS resources used by the other transmission points for measuring downlink channels), where the several transmission points may be transmission points in and/or outside the set of candidate PDSCH transmission points, and the same will apply throughout the following embodiments, so a repeated description thereof will be omitted.

Alternatively, for any one of the transmission points in the set of candidate PDSCH transmission points, among the zero power CSI-RS resources determined by the base station, a part of the zero power CSI-RS resources are configured as interference measurement reference resources, and the other part of the CSI-RS resources correspond to non-zero power CSI-RS resources used by several transmission points.

In the operation 610, the base station notifies the UE of a correspondence relationship between the respective transmission points and the zero power CSI-RS resources.

In an embodiment of the present invention, the base station can notify the correspondence relationship between the respective transmission points and the zero power CSI-RS resources through higher-layer signaling, particularly as follows.

The base station may notify directly, in higher-layer signaling, the UE of the correspondence relationship between the respective transmission points in the set of candidate PDSCH transmission points and the zero power CSI-RS resources, or in the case that the non-zero power CSI-RS resource corresponding to each of the transmission points is known to the UE, the base station may notify, in higher-layer signaling, the UE of a correspondence relationship between the non-zero power CSI-RS resources corresponding to the respective transmission points in the set of candidate PDSCH transmission points and the zero power CSI-RS resources, where a transmission point can correspond to at least one non-zero power CSI-RS resource.

In a particular implementation, the base station can notify, in higher-layer signaling, the UE of sets of PDSCH Resource Element (RE) mapping parameters corresponding to the respective transmission points, where the sets of PDSCH RE mapping parameters includes configuration information of the zero power CSI-RS resources, so that the UE may obtain the correspondence relationship between the respective transmission points and the zero power CSI-RS resources.

In the operation 620, the base station determines and notifies the UE of the current PDSCH transmission point(s) of the UE so that the UE receives PDSCH on the other resources than the zero power CSI-RS resource(s) corresponding to the current PDSCH transmission point(s).

In one embodiment, the base station may determine, from a result of scheduling resources at the network side, respective transmission points currently transmitting PDSCH data with the UE, the respective transmission points are also referred to as PDSCH transmission points. Preferably the base station may notify the UE of the current PDSCH transmission points through Downlink Control Information (DCI) scheduling corresponding PDSCH, where the DCI is transmitted over a Physical Downlink Control Channel (PDCCH) or an Enhanced PDCCH (E-PDCCH). In an implementation, the base station may notify the UE of indexes of the sets of PDSCH RE mapping parameters corresponding to the current PDSCH transmission points instead of notifying the UE of the current PDSCH transmission points directly so that the UE knows information about the current PDSCH transmission points indirectly.

After the UE receives, from the base station, the correspondence relationship between the respective transmission points in the set of candidate PDSCH transmission points and the corresponding zero power CSI-RS resources, and the indication information of the current PDSCH transmission points, the UE determines the current PDSCH transmission points from the indication information of the current PDSCH transmission points and obtains the zero power CSI-RS resources corresponding to the PDSCH transmission points according to the correspondence relationship above. At this time the UE may not receive PDSCH but perform rate matching on physical resources occupied by the zero power CSI-RS resources corresponding to the current PDSCH transmission points, whereas the UE can receive PDSCH on the other resources (i.e., physical resources other than the physical resources above).

In a practical application, the number of PDSCH transmission points included in the set of candidate PDSCH transmission points is one or more than one, where when the number of PDSCH transmission points included in the set of candidate PDSCH transmission points is more than one, the respective PDSCH transmission points are network devices in different cells or network nodes with the same cell ID but at different geographical locations (e.g., RRHs).

On the other hand, the number of current PDSCH transmission points may also be one or more than one, and when there is more than one current PDSCH transmission point, the base station needs to perform the operation 600 to the operation 620 above repeatedly for each of the PDSCH transmission points, to determine a corresponding zero power CSI-RS resource respectively, and to notify the UE that no PDSCH is able to be received on physical resources occupied by these zero power CSI-RS resources.

Figure 7:
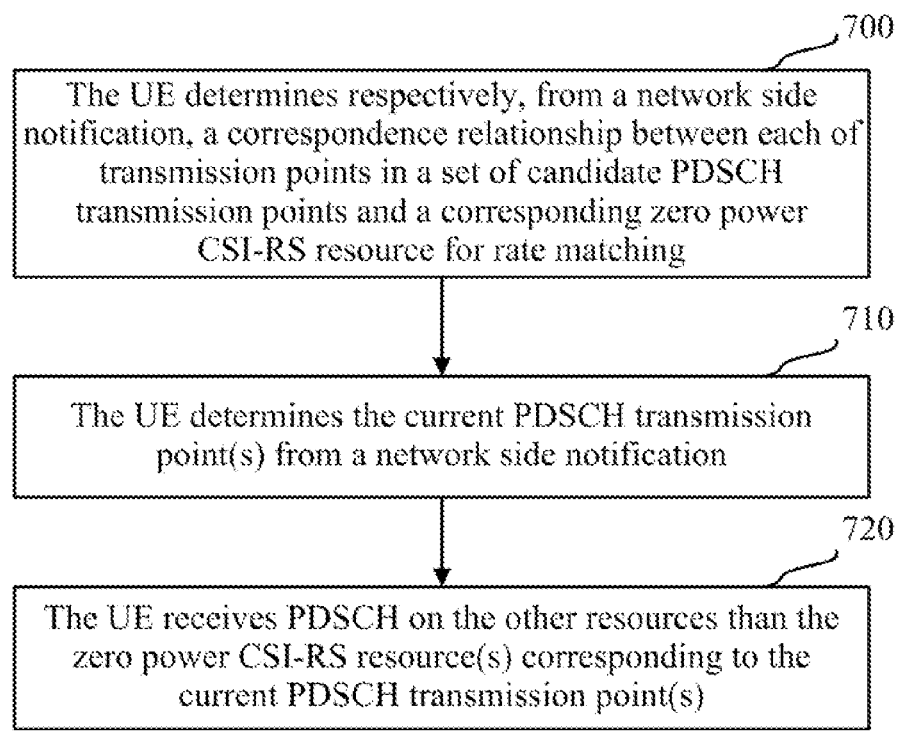
FIG. 7 is a flow chart of determining a PDSCH transmission resource by a user equipment according to an embodiment of the present invention.

Referring to FIG. 7, in correspondence to the flow of the operations above, in an embodiment of the present invention, a UE determines a PDSCH transmission resource in the following detailed flow.

In the operation 700, the UE determines respectively, from a network side notification, a correspondence relationship between each of transmission points in a set of candidate PDSCH transmission points and a corresponding zero power CSI-RS resource.

Like the base station side, among the zero power CSI-RS resources, determined by the UE, corresponding to any one of the transmission points in the set of candidate PDSCH transmission points, all the zero power CSI-RS resources are configured as interference measurement reference resources; or all the zero power CSI-RS resources correspond to non-zero power CSI-RS resources used by several transmission points; or a part of the zero power CSI-RS resources are configured as interference measurement reference resources, and the other part of the CSI-RS resources correspond to non-zero power CSI-RS resources used by several transmission points.

On the other hand, the UE may determine directly, from higher-layer signaling transmitted by the base station, the correspondence relationship between the respective transmission points in the set of candidate PDSCH transmission points and the zero power CSI-RS resources, or in the case that a non-zero power CSI-RS resource corresponding to each of the transmission points is known, the UE may determine from higher-layer signaling transmitted by the network side a correspondence relationship between the non-zero power CSI-RS resources corresponding to the respective transmission points in the set of candidate PDSCH transmission points and the zero power CSI-RS resources.

In the operation 710, the UE determines the current PDSCH transmission point(s) according to a network side notification.

The UE may determine the current PDSCH transmission point(s) from DCI scheduling corresponding PDSCH, where the DCI is transmitted by the network side over a PDCCH or an E-PDCCH.

In the operation 720, the UE receives PDSCH on the other resources than the zero power CSI-RS resource(s) corresponding to the current PDSCH transmission point(s).

Particularly, the UE does not receive PDSCH but performs rate matching on physical resources occupied by the zero power CSI-RS resource(s) corresponding to the current PDSCH transmission point(s) and receives PDSCH on the other resources (i.e., physical resources other than the physical resources above).

The embodiments above will be further described below in details by way of two particular application scenarios, and the following embodiments each will be described by taking as an example zero power CSI-RS resources configured as interference measurement reference resources.

In a first scenario:

The base station notifies the UE of a cooperation set including transmission points possibly to transmit PDSCH data to the UE, where the cooperation set includes three transmission points {TP1, TP2, TP3}, and the base station configures the UE with four interference measurement reference resources respectively for measuring interference outside four sets of transmission points {TP1}, {TP2}, {TP3} and {TP1, TP2, TP3}.

The base station determines the two interference measurement reference resources for measuring interference outside {TP1} and interference outside {TP1, TP2, TP3} as zero power CSI-RS resources to be rate-matched for the TP1 in the cooperation set (denoted as ZP1 and ZP4); determines the two interference measurement reference resources for measuring interference outside (TP2 and interference outside {TP1, TP2, TP3} as zero power CSI-RS resources to be rate-matched for the TP2 in the cooperation set (denoted as ZP2 and ZP4); and determines the two interference measurement reference resources for measuring interference outside {TP3} and interference outside {TP1, TP2, TP3} as zero power CSI-RS resources to be rate-matched for the TP3 in the cooperation set (denoted as ZP3 and ZP4); and The base station notifies, in higher-layer signaling, the UE of a correspondence relationship between the PDSCH transmission points in the cooperation set and the zero power CSI-RS resources, particularly as depicted in Table 1.

TABLE 1

| TP1 | ZP1, ZP4 |
| TP2 | ZP2, ZP4 |
| TP3 | ZP3, ZP4 |

The base station notifies, in DCI signaling over a PDCCH, the UE of indication information of the current PDSCH transmission point. For example, the UE can be notified, in 2-bit DCI signaling, of information about the current PDSCH transmission point in a mapping relationship as depicted in Table 2:

TABLE 2

| Index of the indication | Contents of the indication |
|---|---|
| 00 | First transmission point in the cooperation set |
| 01 | Second transmission point in the cooperation set |
| 10 | Third transmission point in the cooperation set |
| 11 | Reserved or for other indications |

After the UE receives the higher-layer signaling and the DCI information transmitted by the base station, the UE obtains the current PDSCH transmission point from the indication information about the current PDSCH transmission point in the DCI, for example, if the current indication shows 01, then the UE knows that the current PDSCH transmission point is the TP2; and the UE further determines the zero power CSI-RS resources corresponding to the TP2 as ZP2 and ZP4 according to the correspondence relationship, notified in the higher-layer signaling, between the PDSCH transmission points and the zero power CSI-RS resources, so that the UE determines that the UE may not receive PDSCH on the physical resources occupied by the determined ZP2 and ZP4 but may perform rate matching at the locations of these physical resources and receive PDSCH on the other physical resources than these physical resources.

In a second scenario:

The base station notifies the UE of a measurement set including transmission points possibly to transmit PDSCH data to the UE, where the measurement set includes three transmission points {TP1, TP2, TP3}, and the base station configures the UE with five interference measurement reference resources respectively for measuring interference outside five sets of transmission points {TP1}, {TP2}, {TP3}, {TP2, TP3} and {TP2, TP3}.

The base station determines the two interference measurement reference resources for measuring interference outside {TP1} and interference outside {TP1, TP2} as zero power CSI-RS resources to be rate-matched for the TP1 in the measurement set (denoted as ZP1 and ZP4); determines the three interference measurement reference resources for measuring interference outside {TP2}, interference outside {TP1, TP2} and interference outside {TP2, TP3} as zero power CSI-RS resources to be rate-matched for the TP2 in the measurement set (denoted as ZP2, ZP4 and ZP5); and determines the two interference measurement reference resources for measuring interference outside {TP3} and interference outside {TP2, TP3} as zero power CSI-RS resources to be rate-matched for the TP3 in the measurement set (denoted as ZP3 and ZP6); and The base station notifies, in higher-layer signaling, the UE of a correspondence relationship between the PDSCH transmission points in the measurement set and the zero power CSI-RS resources, particularly as depicted in Table 3.

TABLE 3

| TP1 | ZP1, ZP4 |
| TP2 | ZP2, ZP4, ZP5 |
| TP3 | ZP3, ZP6 |

The base station notifies, in DCI signaling over a PDCCH, the UE of indication information of the current PDSCH transmission point(s). For example, the UE can be notified in 3-bit DCI signaling of information about the current PDSCH transmission point(s) in a mapping relationship as depicted in Table 4:

TABLE 4

| Index of the indication | Contents of the indication |
|---|---|
| 000 | First transmission point in the measurement set |
| 001 | Second transmission point in the measurement set |
| 010 | Third transmission point in the measurement set |
| 011 | First and second transmission points in the measurement set |
| 100 | Second and third transmission points in the measurement set |
| 101 | First and third transmission points in the measurement set |
| 110 | First, second and third transmission points in the measurement set |
| 111 | Reserved or for other indications |

Alternatively, the UE may be notified, in a bitmap, of the information about the current PDSCH transmission point(s), but a repeated description thereof will be omitted here.

After the UE receives the higher-layer signaling and the DCI information transmitted by the base station, the UE obtains the current PDSCH transmission point(s) from the indication information about the current PDSCH transmission points in the DCI, for example, if the current indication shows 101, then the UE knows that the current PDSCH transmission points are the TP1 and the TP3; and the UE further determines the zero power CSI-RS resources corresponding to the TP1 as the ZP2 and the ZP4, and the zero power CSI-RS resources corresponding to the TP3 as the ZP3 and the ZP6, according to the correspondence relationship notified in the higher-layer signaling, between the PDSCH transmission points and the zero power CSI-RS resources, so that the UE determines that the UE may not receive PDSCH on physical resources occupied by the determined ZP2 and ZP4, and ZP3 and ZP6 but may perform rate matching at the locations of these physical resources and receive PDSCH on the other physical resources than these physical resources.

In summary, in embodiments of the present invention, a mapping relationship between PDSCH transmission points and zero power CSI-RSs is determined by the network side for a UE, and the UE will not receive PDSCH on a zero power CSI-RS resource for measurement interference corresponding to a cell in which a PDSCH is transmitted currently, but still receive a PDSCH on a zero power CSI-RS resource for measurement interference corresponding to a cell in which no PDSCH is transmitted currently, so that all the UEs can measure desirable interference to thereby ensure that the UEs are enable to make accurate interference measurement so as to improve the accuracy of estimating a CQI; and on the other hand, the signaling overheads required for the implementation of technical solutions of the present invention are very low, only some RRC signaling is required, and the dynamic signaling may maximize the reuse of current signaling, thus effectively improving the compatibility of the system and lowering the implementing complexity of the system.

Those skilled in the art shall appreciate that embodiments of the present invention can be embodied as a method, a system or a computer program product. Therefore the present invention can be embodied in the form of an all-hardware embodiment, an all-software embodiment or an embodiment of software and hardware in combination. Furthermore the present invention can be embodied in the form of a computer program product embodied in one or more computer useable storage mediums (including but not limited to a disk memory, a CD-ROM, an optical memory, etc.) in which computer useable program codes are contained.

The present invention has been described in a flow chart and/or a block diagram of the method, the device (system) and the computer program product according to the embodiments of the present invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the present invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the present invention.

Evidently those skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

The invention claimed is:

1. A method for determining Physical Downlink Shared Channel (PDSCH) transmission resources, comprising:
   determining respectively a zero power Channel State Information-Reference Signal (CSI-RS) resource corresponding to each of transmission points in a set of candidate PDSCH transmission points of a user equipment;
   notifying the user equipment of a correspondence relationship between respective transmission points and the zero power CSI-RS resources; and
   determining and notifying the user equipment of a current PDSCH transmission point of the user equipment so that the user equipment receives PDSCH on other resources than a zero power CSI-RS resource corresponding to the current PDSCH transmission point.

2. The method according to claim 1, wherein among the zero power CSI-RS resources determined for any one of the transmission points in the set of candidate PDSCH transmission points, all the zero power CSI-RS resources are configured as interference measurement reference resources; or
   among the zero power CSI-RS resources determined for any one of the transmission points in the set of candidate PDSCH transmission points, all the zero power CSI-RS resources correspond to non-zero power CSI-RS resources used by several transmission points; or
   among the zero power CSI-RS resources determined for any one of the transmission points in the set of candidate PDSCH transmission points, a part of the zero power CSI-RS resources are configured as interference measurement reference resources, and other part of the CSI-RS resources correspond to non-zero power CSI-RS resources used by several transmission points.

3. The method according to claim 1, wherein notifying the user equipment of the correspondence relationship between the respective transmission points and the zero power CSI-RS resources comprises:
   notifying directly, in higher-layer signaling, the user equipment of the correspondence relationship between the respective transmission points in the set of candidate PDSCH transmission points and the zero power CSI-RS resources; or
   notifying in higher-layer signaling the user equipment of a correspondence relationship between non-zero power CSI-RS resources corresponding to the respective transmission points in the set of candidate PDSCH transmission points and the zero power CSI-RS resources, in a case that the non-zero power CSI-RS resource corresponding to each of the transmission points is known to the user equipment.

4. The method according to claim 1, wherein determining and notifying the user equipment of the current PDSCH transmission point of the user equipment comprises:
   notifying the user equipment of the current PDSCH transmission point in Downlink Control Information (DCI) scheduling corresponding PDSCH, wherein the DCI is transmitted over a Physical Downlink Control Channel (PDCCH) or an Enhanced PDCCH (E-PDCCH).

5. The method according to claim 1, wherein determining and notifying the user equipment of the current PDSCH transmission point of the user equipment so that the user equipment receives PDSCH on the other resources than the zero power CSI-RS resource corresponding to the current PDSCH transmission point comprises:

determining and notifying the user equipment of the current PDSCH transmission point of the user equipment, making the user equipment not receive PDSCH but perform rate matching on physical resource occupied by the zero power CSI-RS resource corresponding to the current PDSCH transmission point, and receive PDSCH on physical resources which are not occupied by the zero power CSI-RS resources.

6. The method according to claim 1, wherein number of PDSCH transmission points in the set of candidate PDSCH transmission points is one or more than one, and wherein when the number of PDSCH transmission points in the set of candidate PDSCH transmission points is more than one, the respective PDSCH transmission points are network devices in different cells or network nodes with same cell ID but at different geographical locations.

7. A method for determining a Physical Downlink Shared Channel (PDSCH) transmission resource, comprising:

determining respectively, from a network side notification, a correspondence relationship between each of transmission points in a set of candidate PDSCH transmission points and a corresponding zero power Channel State Information-Reference Signal (CSI-RS) resource;

determining a current PDSCH transmission point from a network side notification; and receiving PDSCH on other resources than a zero power CSI-RS resource corresponding to the current PDSCH transmission point.

8. The method according to claim 7, wherein among the zero power CSI-RS resources determined for any one of the transmission points in the set of candidate PDSCH transmission points, all the zero power CSI-RS resources are configured as interference measurement reference resources; or among the zero power CSI-RS resources determined for any one of the transmission points in the set of candidate PDSCH transmission points, all the zero power CSI-RS resources correspond to non-zero power CSI-RS resources used by several transmission points; or among the zero power CSI-RS resources determined for any one of the transmission points in the set of candidate PDSCH transmission points, a part of the zero power CSI-RS resources are configured as interference measurement reference resources, and other part of the CSI-RS resources correspond to non-zero power CSI-RS resources used by several transmission points.

9. The method according to claim 7, wherein determining respectively, from the network side notification, the correspondence relationship between each of the transmission points in the set of candidate PDSCH transmission points and the corresponding zero power CSI-RS resource comprises:

determining directly, from higher-layer signaling transmitted by the network side, the correspondence relationship between the respective transmission points in the set of candidate PDSCH transmission points and the zero power CSI-RS resources; or determining, from higher-layer signaling transmitted by the network side, a correspondence relationship between non-zero power CSI-RS resources corresponding to the respective transmission points in the set of candidate PDSCH transmission points and the zero power CSI-RS resources, in a case that the non-zero power CSI-RS resource corresponding to each of the transmission points is known.

10. The method according to claim 7, wherein determining the current PDSCH transmission point from the network side notification comprises:

determining the current PDSCH transmission point from Downlink Control Information (DCI) scheduling corresponding PDSCH, wherein the DCI is transmitted by the network side over a Physical Downlink Control Channel (PDCCH) or an Enhanced Physical Downlink Control Channel (E-PDCCH).

11. The method according to claim 7, wherein receiving PDSCH on the other resources than the zero power CSI-RS resource corresponding to the current PDSCH transmission point comprises:

receiving no PDSCH but performing rate matching on physical resources occupied by the zero power CSI-RS resource corresponding to the current PDSCH transmission point and receiving PDSCH on physical resources which are not occupied by the zero power CSI-RS resources.

12. A device for determining Physical Downlink Shared Channel (PDSCH) transmission resources, comprising:

a determining component configured to determine respectively a zero power Channel State Information-Reference Signal (CSI-RS) resource corresponding to each of transmission points in a set of candidate PDSCH transmission points of a user equipment; and a communicating component configured to notify the user equipment of a correspondence relationship between respective transmission points and the zero power CSI-RS resources and to determine and notify the user equipment of a current PDSCH transmission point of the user equipment so that the user equipment receives PDSCH on other resources than a zero power CSI-RS resource corresponding to the current PDSCH transmission point.

13. The device according to claim 12, wherein among the zero power CSI-RS resources determined by the determining component for any one of the transmission points in the set of candidate PDSCH transmission points, all the zero power CSI-RS resources are configured as interference measurement reference resources; or among the zero power CSI-RS resources determined by the determining component for any one of the transmission points in the set of candidate PDSCH transmission points, all the zero power CSI-RS resources correspond to non-zero power CSI-RS resources used by several transmission points; or among the zero power CSI-RS resources determined by the determining component for any one of the transmission points in the set of candidate PDSCH transmission points, a part of the zero power CSI-RS resources are configured as interference measurement reference resources, and other part of the CSI-RS resources correspond to non-zero power CSI-RS resources used by several transmission points.

14. The device according to claim 12, wherein the communicating component configured to notify the user equipment of the correspondence relationship between the respective transmission points and the zero power CSI-RS resources is further configured to notify directly in higher-layer signaling the user equipment of the correspondence relationship between the respective transmission points in the set of candidate PDSCH transmission points and the zero power CSI-RS resources; or to notify in higher-layer signaling the user equipment of a correspondence relationship between non-zero power CSI-RS resources corresponding to the respective transmission points in the set of candidate PDSCH transmission points and the zero power CSI-RS resources in a case that the non-zero power CSI-RS resource corresponding to each of the transmission points is known to the user equipment.

15. The device according to claim 12, wherein the communicating component configured to determine and notify the user equipment of the current PDSCH transmission point of the user equipment is further configured to notify the user equipment of the current PDSCH transmission point in Downlink Control Information (DCI) scheduling corresponding PDSCH, wherein the DCI is transmitted over a Physical Downlink Control Channel (PDCCH) or an Enhanced PDCCH (E-PDCCH).

16. The device according to claim 12, wherein the communicating component configured to determine and notify the user equipment of the current PDSCH transmission point of the user equipment so that the user equipment receives PDSCH on the other resources than the zero power CSI-RS resource corresponding to the current PDSCH transmission point is further configured:
    to determine and notify the user equipment of the current PDSCH transmission point of the user equipment, making the user equipment not receive PDSCH but perform rate matching on physical resources occupied by the zero power CSI-RS resource corresponding to the current PDSCH transmission point, and receive PDSCH on physical resources which are not occupied by the zero power CSI-RS resources.

\* \* \* \* \*